(No Model.)　　　　　　　　　　　　　　　2 Sheets—Sheet 1.
J. P. CALNAN.
TWO WHEELED VEHICLE.

No. 331,375.　　　　　　　　　　Patented Dec. 1, 1885.

Witnesses:
Wm. A. Rosenbaum
H. A. Daniels

Inventor
James P. Calnan
By W. Burris
Atty (No Model.) 2 Sheets—Sheet 2.
J. P. CALNAN.
TWO WHEELED VEHICLE.
No. 331,375. Patented Dec. 1, 1885.
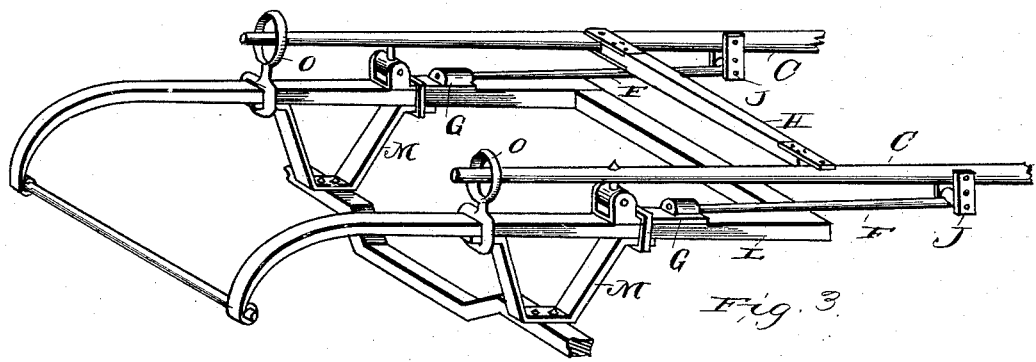
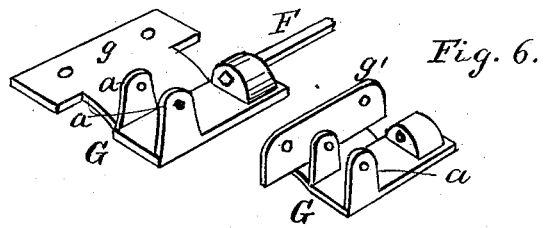
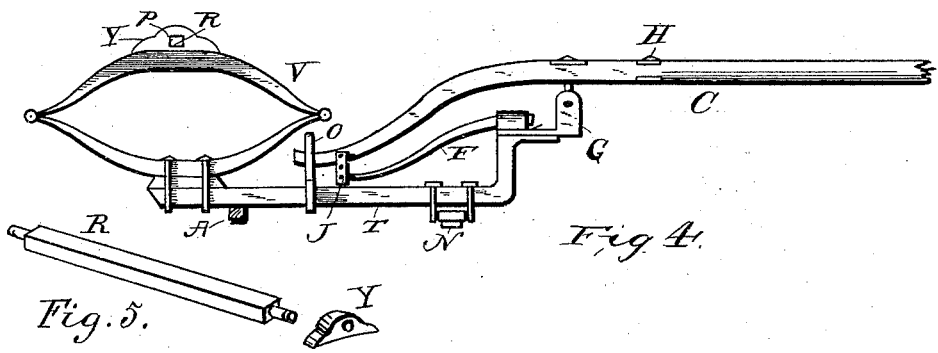
Witnesses:
W. A. Rosenbaum
H. A. Daniels
Inventor,
James P. Calnan
By W. Burris
Atty

UNITED STATES PATENT OFFICE.

JAMES P. CALNAN, OF CLINTON, IOWA.

TWO-WHEELED VEHICLE.

SPECIFICATION forming part of Letters Patent No. 331,375, dated December 1, 1885.

Application filed July 15, 1885. Serial No. 171,684. (No model.)

*To all whom it may concern:*

Be it known that I, JAMES P. CALNAN, a citizen of the United States of America, residing at Clinton, in the county of Clinton and State of Iowa, have invented certain new and useful Improvements in Two-Wheeled Vehicles, of which the following is a specification, reference being had therein to the accompanying drawings.

My invention relates to two-wheeled vehicles; and it consists in certain improvements in the construction of the same, as hereinafter described and claimed, the object of the invention being to render the motion of the body of the vehicle as easy for the occupant and as free from the motion caused by the horse as practicable.

Figure 1:
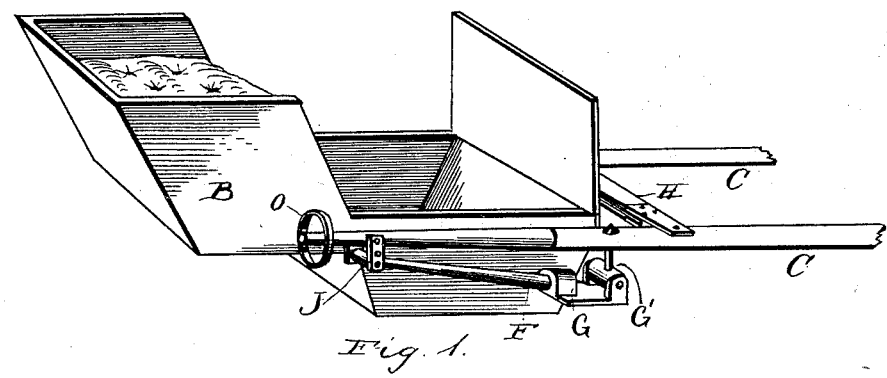
Figure 2:
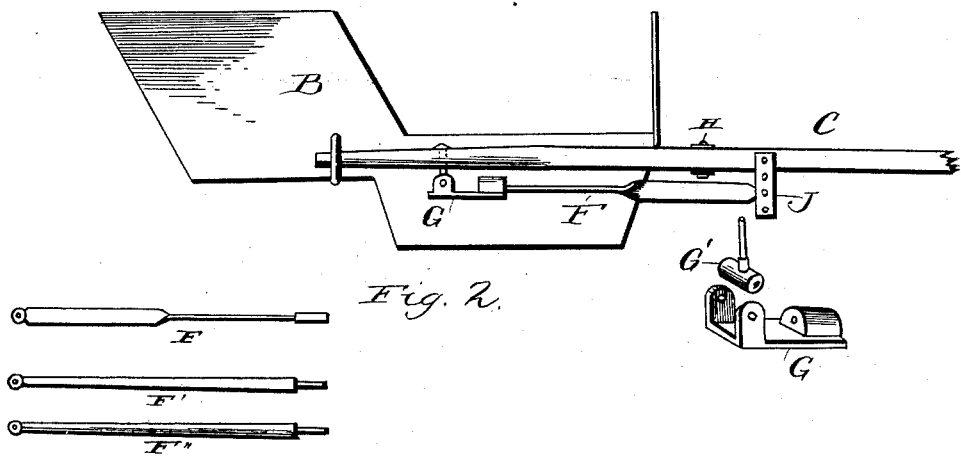

In the accompanying drawings, Figure 1 represents a perspective view of the body of a vehicle and the thills connected thereto. Fig. 2 is a like view showing a modification in construction shown in Fig. 1. Fig. 3 illustrates in perspective the thills in connection with a frame in a running-gear. Fig. 4 is a side view of the invention, the thills being connected with the running-gear. Fig. 5 is a detail view of journaled bar, on which rests the rear end of body, and one of the boxes forming its bearings. Fig. 6 is a detailed view of thill-connecting iron adapted to be attached to the body of the vehicle.

C designates the thills of the vehicle, which are connected by a cross-bar, H, having at each end a pivotal attachment to a thill.

G and G' indicate connecting-irons, by which the thills are connected with the running-gear of the vehicle and the motion of the thills is allowed, as hereinafter set forth. The axle A rests on and is secured to the bars T, the forward ends of which are turned upward and have the irons G secured thereto, as shown.

The thills are attached or connected with the vehicle in the following manner: Each of the irons G is provided with supports or bearings $a$, in which an iron, G', is journaled or pivoted. A fixed bolt or pin, $c$, projects upward from the iron G' and passes through a hole in the thill, being secured so as to form a loose connection with the thill, which is allowed to move laterally freely. The thill extends backward a suitable distance beyond the point of coupling into a ring, O, which is fastened to a bar, T, and forms a guard for the rear end of the thill, limiting its swaying movement.

F indicates a spring, one end of which is secured in a perforated block or enlargement of the iron G, the other end being hung to the thill in a loop or hangers, J. It will be seen from this construction of thills and connecting-irons G G' that each thill has a lateral movement on the bolt $c$, and also a vertical rocking movement from the iron G', turning on its bearings. The spring F, while it serves to retain the thill in position, is flexible enough to allow its vertical and lateral movements with the thill. Several forms of construction of the spring are shown at F F' F². (See Fig. 2.)

As shown in Fig. 4, the bars T extend rearward beyond the axle A, and the elliptic springs V are secured thereto a short distance back of the axle, so that the weight borne by the springs is not directly over the axle. On the tops of springs V are secured the bearings or journal-boxes Y, in which is journaled the cross-bar R. The rear end of the body of the vehicle rests on the cross-bar R, and is secured thereto, the forward end resting on a cross spring, N. When the body is thus supported by the journaled bar and balanced, there is weight enough on the forward spring, N, to press downward the arms T and allow the springs F to have the required lateral and vertical motion without imparting either to the body. If the body were fastened rigidly to the springs V and balanced, when loaded, to take weight from the horse, there would be little or no weight on cross-spring N to hold down the arms T, and the result would be that the arms T would rise and fall more readily than the springs F would yield to the motion of the horse, and would impart like motion to the front end of the body. This is avoided by my construction of the cross-bar mounted on the springs V and journaled in boxes secured to them, the rear end of the body resting on and being fastened to said cross-bar, so that it has a pivotal connection with the springs. As the thill-coupling irons also allow the thills both a lateral and a vertical motion without imparting either motion to the body of the vehicle, the latter is relieved from much shaking and jarring, which would be caused by the motion of the horse or by passing over uneven surfaces. The operation of parts is also rendered somewhat easier by the pivoted cross-bar H connecting the thills.

The fixed rings O, into which the thills extend, are large enough so that ordinarily, when the vehicle is in motion, the thills will not strike against them; but to provide against sudden or violent motion of body the rear ends of thills are covered with rubber or other suitable material for contact with the rings. The rings also take the strain and weight from springs F when a person is getting in or out of the carriage, and in case the springs should break they would retain the thills in position. Each of springs F is rigidly secured at one end to iron G, the other end being secured in the hangers or clevis J, which has holes for the adjustment of the spring, as desired.

Certain modifications may be used in the construction of the vehicle in applying the improvements. As shown in Fig. 4, the rear ends of the thills are bent downward to enter rings O, which are fastened to bars T, while in Fig. 1 the thills are shown made straight, the coupling-irons being secured to the body B, the thill-coupling being applied in some forms of construction directly to the body, when the irons G are fastened to it at any suitable points.

In Fig. 6 two forms of iron G are shown, one of which has a perforated extension, $g$, for securing it to the bottom, and the other, $g'$, for securing it to the sides by means of bolts.

The irons G, with springs F, may be placed in either of the positions shown in Figs. 1 and 2—that is, with the spring extending either forward or rearward from the point of coupling—and the same result will be produced.

The thill-coupling described may be applied to vehicles with various forms of running-gear, as shown in Fig. 3. It is secured to a frame, L, supported by braces M, which connect the frame with axle A.

Having described my invention, I claim—

1. The combination of thills C, fixed coupling-irons G, with bearings $a$, coupling-irons G', mounted on irons G and provided with vertical bolts $c$, having pivotal connection with the thills, and springs F, fastened to irons G and provided with hangers J, connected with the thills, substantially as and for the purposes described.

2. The combination of thills C, connected by a pivoted cross-bar, H, fixed irons G, with bearings $a$, coupling-irons G', journaled in said bearings and provided with vertical bolts $c$, which pass through the thills, springs F, fastened to irons G and provided with hangers J, and fixed rings O, substantially as and for the purposes described.

3. In combination with thill-couplings G G', provided with springs F, the running-gear provided with springs V, supported by bars T, and cross-bar R, journaled in boxes mounted on springs V and supporting the rear of the vehicle-body, substantially as set forth and described.

In testimony whereof I hereto affix my signature in presence of two witnesses.

JAMES P. CALNAN.

Witnesses:
FRANK THORNBURG,
W. W. SANBORN.